(12) United States Patent
McMahan et al.

(10) Patent No.: US 9,563,898 B2
(45) Date of Patent: Feb. 7, 2017

(54) SYSTEM AND METHOD FOR AUTOMATED CUSTOMER ACCOUNT CREATION AND MANAGEMENT

(75) Inventors: Patricia McMahan, Vineland, NJ (US); Bryan Kelly, Alamo, CA (US); Sethuram Shivashankar, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1528 days.

(21) Appl. No.: 12/112,410

(22) Filed: Apr. 30, 2008

(65) Prior Publication Data
US 2009/0276341 A1    Nov. 5, 2009

(51) Int. Cl.
A63F 13/85    (2014.01)
G06Q 30/02    (2012.01)
G06Q 20/10    (2012.01)
G06Q 40/00    (2012.01)

(52) U.S. Cl.
CPC .............. *G06Q 30/02* (2013.01); *G06Q 20/10* (2013.01); *G06Q 30/0224* (2013.01); *G06Q 40/12* (2013.12)

(58) Field of Classification Search
USPC .......................................................... 705/14
See application file for complete search history.

(56) References Cited

U.S. PATENT DOCUMENTS

| | | | |
|---|---|---|---|
| 3,751,041 A | 8/1973 | Seifert | 273/149 P |
| 3,814,436 A | 6/1974 | Boren | 273/149 P |
| 4,135,663 A | 1/1979 | Nojiri et al. | 235/463 |
| 4,244,582 A | 1/1981 | Raees et al. | 273/293 |
| 4,339,798 A | 7/1982 | Hedges et al. | 364/412 |
| 4,373,726 A | 2/1983 | Churchill et al. | 273/138 A |
| 4,534,562 A | 8/1985 | Cuff et al. | 273/149 P |
| 4,636,846 A | 1/1987 | Villarreal | 358/100 |

(Continued)

FOREIGN PATENT DOCUMENTS

| | | |
|---|---|---|
| DE | 3807 127 A1 | 9/1989 |
| DE | 44 39 502 C1 | 9/1995 |

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Robert R Niquette
*Assistant Examiner* — Joseph W King
(74) *Attorney, Agent, or Firm* — Seed IP Law Group LLP

(57) ABSTRACT

A method and system to automatically create and manage patron accounts using electronic data capture at an automated machine or kiosk, including electronically obtaining personal patron identification information from a patron identification source, such as a driver's license, determining if a patron account exists and if the identification source has expired and updating any existing patron account with the captured data. If the patron identification source is current and no account exists, a temporary account is created and a temporary patron account card supplied to the patron along with promotional offers. Patron activity is monitored at the location and used in creating a permanent patron account for providing additional offers, bonuses, and the like to the patron.

20 Claims, 1 Drawing Sheet

(56) References Cited

U.S. PATENT DOCUMENTS

| | | | |
|---|---|---|---|
| 4,662,637 A | 5/1987 | Pfeiffer | 273/149 P |
| 4,667,959 A | 5/1987 | Pfeiffer et al. | 273/149 R |
| 4,693,480 A | 9/1987 | Smith | 273/296 |
| 4,725,079 A | 2/1988 | Koza et al. | 283/73 |
| 4,802,218 A | 1/1989 | Wright et al. | 380/23 |
| 4,814,589 A | 3/1989 | Storch et al. | 235/375 |
| 4,832,341 A | 5/1989 | Muller et al. | 273/139 |
| 4,885,700 A | 12/1989 | Kondziolka et al. | 364/519 |
| 4,889,367 A | 12/1989 | Miller | 283/88 |
| 4,951,950 A | 8/1990 | Normand et al. | 273/149 P |
| 4,995,615 A | 2/1991 | Cheng | 273/292 |
| 5,053,612 A | 10/1991 | Pielemeier et al. | 235/462 |
| 5,067,713 A | 11/1991 | Soules et al. | 273/149 P |
| 5,110,134 A | 5/1992 | Laughlin et al. | 273/293 |
| 5,121,921 A | 6/1992 | Friedman et al. | 273/149 P |
| 5,179,517 A | 1/1993 | Sarbin et al. | 364/410 |
| 5,199,710 A | 4/1993 | Lamle | 273/149 R |
| 5,216,234 A | 6/1993 | Bell | 235/494 |
| 5,259,907 A | 11/1993 | Soules et al. | 156/277 |
| 5,265,874 A | 11/1993 | Dickinson et al. | 273/138 A |
| 5,283,422 A | 2/1994 | Storch et al. | 235/375 |
| 5,319,181 A | 6/1994 | Shellhammer et al. | 235/462 |
| 5,321,241 A | 6/1994 | Craine | 235/380 |
| 5,343,028 A | 8/1994 | Figarella et al. | 235/462 |
| 5,397,133 A | 3/1995 | Penzias | 273/439 |
| 5,470,079 A | 11/1995 | LeStrange et al. | 273/138 A |
| 5,487,544 A | 1/1996 | Clapper, Jr. | 273/138 A |
| 5,493,613 A | 2/1996 | Denno et al. | 380/24 |
| 5,505,461 A | 4/1996 | Bell et al. | 273/433 |
| 5,518,249 A | 5/1996 | Sines et al. | 273/304 |
| 5,548,110 A | 8/1996 | Storch et al. | 235/472 |
| 5,559,312 A | 9/1996 | Lucero | 235/380 |
| 5,605,504 A | 2/1997 | Huang | 463/22 |
| 5,613,912 A | 3/1997 | Slater | 463/25 |
| 5,655,961 A | 8/1997 | Acres et al. | 463/27 |
| 5,759,103 A | 6/1998 | Freels et al. | 463/42 |
| 5,769,458 A | 6/1998 | Carides et al. | 283/102 |
| 5,770,533 A | 6/1998 | Franchi | 463/42 |
| 5,780,831 A | 7/1998 | Seo et al. | 235/462 |
| 5,791,988 A | 8/1998 | Nomi | 463/11 |
| 5,800,268 A | 9/1998 | Molnick | 463/40 |
| 5,813,912 A | 9/1998 | Shultz | 463/25 |
| 5,823,534 A | 10/1998 | Banyai | 273/269 |
| 5,823,879 A | 10/1998 | Goldberg et al. | 463/42 |
| 5,830,067 A | 11/1998 | Graves et al. | 463/40 |
| 5,851,149 A | 12/1998 | Xidos et al. | 463/42 |
| 5,867,586 A | 2/1999 | Liang | 382/112 |
| 5,902,983 A | 5/1999 | Crevelt et al. | 235/380 |
| 5,919,091 A | 7/1999 | Bell et al. | 463/25 |
| 5,941,769 A | 8/1999 | Order | 463/12 |
| 5,941,771 A | 8/1999 | Haste, III | 463/17 |
| 5,999,808 A | 12/1999 | LaDue | 455/412 |
| 6,042,150 A | 3/2000 | Daley | 283/86 |
| 6,048,269 A | 4/2000 | Burns et al. | 463/25 |
| 6,062,481 A | 5/2000 | Storch et al. | 235/494 |
| 6,066,439 A | 5/2000 | Nohr et al. | 430/347 |
| 6,083,105 A | 7/2000 | Ronin et al. | 463/17 |
| 6,120,588 A | 9/2000 | Jacobson | 106/31.16 |
| 6,142,876 A | 11/2000 | Cumbers | 463/25 |
| 6,145,838 A | 11/2000 | White | 273/295 |
| 6,190,256 B1 | 2/2001 | Walker et al. | 463/25 |
| 6,227,972 B1 | 5/2001 | Walker et al. | 463/25 |
| 6,234,898 B1 | 5/2001 | Belamant et al. | 463/25 |
| 6,244,958 B1 | 6/2001 | Acres | 463/26 |
| 6,287,202 B1 | 9/2001 | Pascal et al. | 463/42 |
| 6,347,738 B1 | 2/2002 | Crevelt et al. | 235/380 |
| 6,371,482 B1 | 4/2002 | Hall, Jr. | 273/138.1 |
| 6,383,076 B1 | 5/2002 | Tiedeken | 463/40 |
| 6,394,907 B1 | 5/2002 | Rowe | 463/42 |
| 6,409,602 B1 | 6/2002 | Wiltshire et al. | 463/42 |
| 6,460,848 B1 | 10/2002 | Soltys et al. | 273/149 R |
| 6,464,584 B2 | 10/2002 | Oliver | 463/25 |
| 6,468,155 B1 | 10/2002 | Zucker et al. | 463/23 |
| 6,505,772 B1 | 1/2003 | Mollett et al. | 235/379 |
| 6,508,709 B1 | 1/2003 | Karmarkar | 463/42 |
| 6,508,710 B1 | 1/2003 | Paravia et al. | 463/42 |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,527,638 B1 | 3/2003 | Walker et al. | 463/25 |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,547,131 B1 | 4/2003 | Foodman et al. | 235/380 |
| 6,575,829 B2 | 6/2003 | Coleman et al. | 463/20 |
| 6,575,834 B1 | 6/2003 | Lindo | 463/40 |
| 6,579,179 B2 | 6/2003 | Poole et al. | 463/25 |
| 6,579,180 B2 | 6/2003 | Soltys et al. | 463/25 |
| 6,579,181 B2 | 6/2003 | Soltys et al. | 463/25 |
| 6,585,598 B2 | 7/2003 | Nguyen et al. | 463/41 |
| 6,595,857 B2 | 7/2003 | Soltys et al. | 463/29 |
| 6,607,441 B1 | 8/2003 | Acres | 463/25 |
| 6,612,928 B1 | 9/2003 | Bradford et al. | 463/29 |
| 6,629,591 B1 | 10/2003 | Griswold et al. | 194/205 |
| 6,638,161 B2 | 10/2003 | Soltys et al. | 463/12 |
| 6,663,490 B2 | 12/2003 | Soltys et al. | 463/25 |
| 6,676,522 B2 | 1/2004 | Rowe et al. | 463/42 |
| 6,688,979 B2 | 2/2004 | Soltys et al. | 463/25 |
| 6,702,291 B2 | 3/2004 | Grebler et al. | 273/292 |
| 6,702,672 B1 | 3/2004 | Angell et al. | 463/25 |
| 6,712,696 B2 | 3/2004 | Soltys et al. | 463/25 |
| 6,739,975 B2 | 5/2004 | Nguyen et al. | 463/39 |
| 6,746,330 B2 | 6/2004 | Cannon | 463/25 |
| 6,752,312 B1 | 6/2004 | Chamberlain et al. | 235/375 |
| 6,755,741 B1 | 6/2004 | Rafaeli | 463/25 |
| 6,758,751 B2 | 7/2004 | Soltys et al. | 463/29 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,837,789 B2 | 1/2005 | Garahi et al. | 463/29 |
| 6,866,586 B2 | 3/2005 | Oberberger et al. | 463/42 |
| 6,896,618 B2 | 5/2005 | Benoy et al. | 463/25 |
| 6,905,411 B2 | 6/2005 | Nguyen et al. | 463/25 |
| 6,971,956 B2 | 12/2005 | Rowe et al. | 463/25 |
| 6,991,540 B2 | 1/2006 | Marlow | 463/16 |
| 7,011,309 B2 | 3/2006 | Soltys et al. | 273/149 R |
| 7,029,009 B2 | 4/2006 | Grauzer et al. | 273/149 P |
| 7,035,626 B1 | 4/2006 | Luciano, Jr. | 455/414.1 |
| 7,063,617 B2 | 6/2006 | Brosnan et al. | 463/25 |
| 7,077,332 B2 | 7/2006 | Verschuur et al. | 235/492 |
| 7,086,947 B2 * | 8/2006 | Walker et al. | 463/25 |
| 7,099,035 B2 | 8/2006 | Brooks et al. | 358/1.15 |
| 7,103,438 B2 | 9/2006 | Hallowell et al. | 700/116 |
| 7,213,812 B2 | 5/2007 | Schubert et al. | 273/149 R |
| 7,303,475 B2 | 12/2007 | Britt et al. | 463/42 |
| 7,309,065 B2 | 12/2007 | Yoseloff et al. | 273/292 |
| 7,311,605 B2 | 12/2007 | Moser | 463/25 |
| 7,331,520 B2 | 2/2008 | Silva et al. | 235/381 |
| 7,390,256 B2 | 6/2008 | Soltys et al. | 463/12 |
| 7,407,438 B2 | 8/2008 | Schubert et al. | 463/22 |
| 7,410,422 B2 | 8/2008 | Fine | 463/42 |
| 7,419,428 B2 | 9/2008 | Rowe | 463/25 |
| 7,422,522 B2 | 9/2008 | Fujimoto et al. | 463/16 |
| 7,434,805 B2 | 10/2008 | Grauzer et al. | 273/149 R |
| 7,448,626 B2 | 11/2008 | Fleckenstein | 273/149 R |
| 7,500,915 B2 | 3/2009 | Wolf et al. | 463/27 |
| 7,510,186 B2 | 3/2009 | Fleckenstein | 273/149 R |
| 7,510,194 B2 | 3/2009 | Soltys et al. | 273/293 |
| 7,510,474 B2 | 3/2009 | Carter, Sr. | 463/29 |
| 7,523,937 B2 | 4/2009 | Fleckenstein | 273/149 R |
| 7,534,169 B2 | 5/2009 | Amaitis et al. | 463/39 |
| 7,575,234 B2 | 8/2009 | Soltys et al. | 273/149 R |
| 7,637,810 B2 | 12/2009 | Amaitis et al. | 463/25 |
| 7,644,861 B2 | 1/2010 | Alderucci et al. | 235/382 |
| 7,648,414 B2 | 1/2010 | McNutt et al. | 463/25 |
| 7,690,995 B2 | 4/2010 | Frankulin et al. | 463/41 |
| 7,722,453 B2 | 5/2010 | Lark et al. | 463/16 |
| 7,753,789 B2 | 7/2010 | Walker et al. | 463/42 |
| 7,762,888 B2 * | 7/2010 | Rowe | 463/29 |
| 7,780,526 B2 | 8/2010 | Nguyen et al. | 463/29 |
| 7,850,528 B2 | 12/2010 | Wells | 463/42 |
| 7,862,425 B2 | 1/2011 | Cavagna | 463/25 |

(56) References Cited

U.S. PATENT DOCUMENTS

| | | | |
|---|---|---|---|
| 8,201,229 B2 | 6/2012 | Ruppert et al. | |
| 2001/0019966 A1 | 9/2001 | Idaka | 463/40 |
| 2002/0111213 A1 | 8/2002 | McEntee et al. | 463/42 |
| 2002/0113371 A1 | 8/2002 | Snow | 273/292 |
| 2002/0115487 A1 | 8/2002 | Wells | 463/42 |
| 2002/0142844 A1 | 10/2002 | Kerr | 463/42 |
| 2003/0004871 A1 | 1/2003 | Rowe | 705/39 |
| 2003/0022714 A1 | 1/2003 | Oliver | 463/25 |
| 2003/0027625 A1 | 2/2003 | Rowe | 463/20 |
| 2003/0028480 A1 | 2/2003 | Rowe | 705/39 |
| 2003/0032474 A1 | 2/2003 | Kaminkow | 463/25 |
| 2003/0036425 A1 | 2/2003 | Kaminkow et al. | 463/25 |
| 2003/0042679 A1 | 3/2003 | Snow | 273/292 |
| 2003/0045354 A1 | 3/2003 | Giobbi | 463/40 |
| 2003/0064798 A1 | 4/2003 | Grauzer et al. | 463/29 |
| 2003/0078789 A1 | 4/2003 | Oren | 705/1 |
| 2003/0083126 A1 | 5/2003 | Paulsen | 463/25 |
| 2003/0090064 A1 | 5/2003 | Hoyt et al. | 273/292 |
| 2003/0104865 A1 | 6/2003 | Itkis et al. | 463/39 |
| 2003/0186739 A1 | 10/2003 | Paulsen et al. | 463/25 |
| 2003/0232651 A1 | 12/2003 | Huard | 463/42 |
| 2004/0005920 A1 | 1/2004 | Soltys et al. | 463/25 |
| 2004/0029635 A1 | 2/2004 | Giobbi | 463/30 |
| 2004/0033095 A1 | 2/2004 | Saffari et al. | 400/120.01 |
| 2004/0087375 A1 | 5/2004 | Gelinotte | 463/47 |
| 2004/0127291 A1 | 7/2004 | George et al. | 463/42 |
| 2004/0132529 A1 | 7/2004 | Mkrtchyan et al. | 463/29 |
| 2004/0133485 A1 | 7/2004 | Schoomaker et al. | 705/30 |
| 2004/0142744 A1 | 7/2004 | Atkinson et al. | 463/29 |
| 2004/0150702 A1 | 8/2004 | Tsuyoshi et al. | 347/100 |
| 2004/0166918 A1 | 8/2004 | Walker et al. | 463/16 |
| 2004/0166940 A1 | 8/2004 | Rothschild | |
| 2004/0254010 A1 | 12/2004 | Fine | 463/25 |
| 2004/0259618 A1 | 12/2004 | Soltys et al. | 463/11 |
| 2005/0043094 A1 | 2/2005 | Nguyen et al. | 463/42 |
| 2005/0054438 A1 | 3/2005 | Rothschild et al. | 463/29 |
| 2005/0059479 A1 | 3/2005 | Soltys et al. | 463/25 |
| 2005/0070358 A1 | 3/2005 | Angell et al. | 463/39 |
| 2005/0116417 A1 | 6/2005 | Soltys et al. | 273/292 |
| 2005/0124411 A1* | 6/2005 | Schneider et al. | 463/29 |
| 2005/0156318 A1 | 7/2005 | Douglas | 257/761 |
| 2005/0176507 A1 | 8/2005 | Ephrati | 463/39 |
| 2005/0181856 A1 | 8/2005 | Cannon et al. | 463/16 |
| 2005/0221882 A1 | 10/2005 | Nguyen et al. | 463/16 |
| 2005/0227760 A1 | 10/2005 | Vlazny et al. | 463/28 |
| 2005/0266919 A1 | 12/2005 | Rowe et al. | 463/25 |
| 2005/0282614 A1 | 12/2005 | Gauselmann | 463/20 |
| 2005/0282626 A1 | 12/2005 | Manfredi et al. | 463/25 |
| 2006/0009282 A1 | 1/2006 | George et al. | 463/29 |
| 2006/0015716 A1 | 1/2006 | Thornton et al. | |
| 2006/0019745 A1 | 1/2006 | Benbrahim | 463/29 |
| 2006/0035707 A1 | 2/2006 | Nguyen et al. | 463/29 |
| 2006/0046849 A1 | 3/2006 | Kovacs | 463/39 |
| 2006/0121970 A1 | 6/2006 | Khal | 463/16 |
| 2006/0183541 A1 | 8/2006 | Okada et al. | 463/29 |
| 2006/0205508 A1 | 9/2006 | Green | 463/40 |
| 2006/0205519 A1 | 9/2006 | Soltys | 463/47 |
| 2006/0211481 A1 | 9/2006 | Soltys et al. | 463/16 |
| 2006/0247013 A1 | 11/2006 | Walker et al. | 463/20 |
| 2007/0004500 A1 | 1/2007 | Soltys et al. | 463/22 |
| 2007/0015583 A1 | 1/2007 | Tran | 463/40 |
| 2007/0054725 A1 | 3/2007 | Morrow et al. | 463/16 |
| 2007/0057453 A1 | 3/2007 | Soltys et al. | 273/149 P |
| 2007/0057454 A1 | 3/2007 | Fleckenstein | 273/149 R |
| 2007/0057462 A1 | 3/2007 | Fleckenstein | 273/274 |
| 2007/0057466 A1 | 3/2007 | Soltys et al. | 273/292 |
| 2007/0060259 A1 | 3/2007 | Pececnik | 463/16 |
| 2007/0060260 A1 | 3/2007 | Fleckenstein | 463/16 |
| 2007/0060307 A1 | 3/2007 | Mathis et al. | 463/25 |
| 2007/0077990 A1 | 4/2007 | Cuddy et al. | 463/25 |
| 2007/0093298 A1 | 4/2007 | Brunet | 463/42 |
| 2007/0111775 A1 | 5/2007 | Yoseloff | 463/16 |
| 2007/0117608 A1 | 5/2007 | Roper et al. | 463/16 |
| 2007/0167235 A1 | 7/2007 | Naicker | 463/42 |
| 2007/0168251 A1 | 7/2007 | Hilbert et al. | 705/14 |
| 2007/0198418 A1 | 8/2007 | MacDonald et al. | 705/52 |
| 2007/0208816 A1 | 9/2007 | Baldwin et al. | 709/206 |
| 2007/0235521 A1 | 10/2007 | Mateen et al. | 235/379 |
| 2007/0241497 A1 | 10/2007 | Soltys et al. | 273/149 R |
| 2007/0241498 A1 | 10/2007 | Soltys | 273/149 R |
| 2007/0243925 A1 | 10/2007 | LeMay et al. | 463/20 |
| 2007/0243927 A1 | 10/2007 | Soltys | 463/25 |
| 2007/0243935 A1 | 10/2007 | Huizinga | 463/42 |
| 2007/0259709 A1 | 11/2007 | Kelly et al. | 463/20 |
| 2007/0287534 A1 | 12/2007 | Fleckenstein | 463/29 |
| 2007/0287535 A1 | 12/2007 | Soltys | 463/29 |
| 2007/0293303 A1 | 12/2007 | Shayesteh | 463/25 |
| 2007/0298865 A1 | 12/2007 | Soltys | 463/22 |
| 2007/0298868 A1 | 12/2007 | Soltys | 463/25 |
| 2008/0004108 A1 | 1/2008 | Klinkhammer | 463/29 |
| 2008/0038035 A1 | 2/2008 | Shuldman et al. | 400/76 |
| 2008/0045344 A1 | 2/2008 | Schlottmann et al. | 463/25 |
| 2008/0076572 A1 | 3/2008 | Nguyen et al. | 463/42 |
| 2008/0090651 A1 | 4/2008 | Baerlocher | 463/27 |
| 2008/0096659 A1 | 4/2008 | Kreloff et al. | 463/39 |
| 2008/0113764 A1 | 5/2008 | Soltys | 463/22 |
| 2008/0113773 A1 | 5/2008 | Johnson et al. | 463/25 |
| 2008/0113781 A1 | 5/2008 | Soltys et al. | 463/28 |
| 2008/0119284 A1 | 5/2008 | Luciano, Jr. et al. | 463/42 |
| 2008/0146337 A1 | 6/2008 | Halonen et al. | 463/42 |
| 2008/0261701 A1 | 10/2008 | Lewin et al. | 463/43 |
| 2008/0311971 A1 | 12/2008 | Dean | 463/20 |
| 2009/0005176 A1 | 1/2009 | Morrow et al. | 463/43 |
| 2009/0115133 A1 | 5/2009 | Kelly et al. | 273/274 |
| 2009/0117994 A1 | 5/2009 | Kelly et al. | 463/25 |
| 2009/0118001 A1 | 5/2009 | Kelly et al. | 463/29 |
| 2009/0118005 A1 | 5/2009 | Kelly et al. | 463/31 |
| 2009/0118006 A1 | 5/2009 | Kelly et al. | 463/31 |
| 2009/0163279 A1 | 6/2009 | Hermansen et al. | 463/42 |
| 2009/0170594 A1 | 7/2009 | Delaney et al. | 463/25 |
| 2009/0270170 A1 | 10/2009 | Patton | 463/36 |
| 2009/0275374 A1 | 11/2009 | Nelson et al. | 463/16 |
| 2009/0275393 A1 | 11/2009 | Kisenwether et al. | 463/25 |
| 2009/0275394 A1 | 11/2009 | Young et al. | 463/25 |
| 2009/0275395 A1 | 11/2009 | McAllister et al. | 463/25 |
| 2009/0275398 A1 | 11/2009 | Nelson | 463/27 |
| 2009/0275399 A1 | 11/2009 | Kelly et al. | 463/27 |
| 2009/0275400 A1 | 11/2009 | Rehm et al. | 463/27 |
| 2009/0275402 A1 | 11/2009 | Backover et al. | 463/29 |
| 2009/0275407 A1 | 11/2009 | Singh et al. | 463/31 |
| 2009/0275411 A1 | 11/2009 | Kisenwether et al. | 463/42 |
| 2009/0276341 A1 | 11/2009 | McMahan et al. | 705/30 |
| 2009/0276715 A1 | 11/2009 | Arbogast et al. | 715/736 |
| 2009/0307069 A1 | 12/2009 | Meyerhofer | 705/14.12 |
| 2010/0016068 A1 | 1/2010 | White et al. | 463/25 |
| 2010/0125851 A1 | 5/2010 | Singh et al. | 718/104 |

FOREIGN PATENT DOCUMENTS

| | | | |
|---|---|---|---|
| EP | 0 327 069 A2 | 8/1989 | |
| EP | 0 790 848 B1 | 8/1997 | |
| EP | 0 700 980 B1 | 11/1999 | |
| EP | 1463008 A2 | 9/2004 | |
| GB | 2 370 791 A | 7/2002 | |
| GB | 2 382 034 A | 5/2003 | |
| JP | 8255059 | 10/1996 | |
| KR | 2002-0061793 | 7/2002 | |
| WO | 96/14115 | 5/1996 | |
| WO | 2006/110348 | 10/2006 | |

OTHER PUBLICATIONS

Bally TMS, "MP21—Automated Table Tracking/Features," 2 pages, Nov. 2005.

Bally TMS, "MPBacc—Specifications/Specifications," 2 pages, Nov. 2005.

Burke, A., "Tracking the Tables," reprinted from *International Gaming & Wagering Business*, Aug. 2003, 4 pages.

*Gambling Magazine*, "Gaming Company Takes RFID to the Casino," Dec. 27, 2004, accessed Aug. 25, 2006, URL=http:/www.gamblingmagazine.com/managearticle.asp?C=290&A=13186, 4 pages.

(56) References Cited

OTHER PUBLICATIONS

Gros, R., "All You Ever Wanted to Know About Table Games," reprinted from *Global Gaming Business*, Aug. 1, 2003, 2 pages.

Mikohn, "Mikohn Tablelink—The Industry's Premier Table Tracking Solution Delivers Improvements Straight to the Bottom Line," 2 pages, before Jan. 1, 2004.

Mikohn, "Tablelink™, The New Standard in Table Games," before Jan. 1, 2004, 14 pages.

Plaintiff's Declaration of Lawrence Luciano in Opposition to Shuffle Master's Motion for Preliminary Injunction, *Card, LLC* v. *Shuffle Master, Inc.*, D. Nev. (No. CV-N-03-0244-ECR-(RAM)), Nov. 24, 2003.

Shuffle Master, Inc., "Shuffle Master Announces New Products; Intelligent Table System to Be Debuted at G2E," Sep. 10, 2003, 2 pages.

Terdiman, D., "Who's Holding the Aces Now?", reprinted from *Wired News*, Aug. 18, 2003, 2 pages.

Winkler, C., "Product Spotlight: MindPlay," reprinted from *Gaming and Leisure Technology*, Fall 2003, 2 pages.

MagTek, "Port Powered Swipe Reader," Technical Reference Manual, Manual Part No. 99875094 Rev 12, Jun. 2003, 20 pages.

International Search Report, mailed Dec. 14, 2009, for PCT/US2009/042155, 3 pages.

Written Opinion, mailed Dec. 14, 2009, for PCT/US2009/042155, 4 pages.

Ruppert et al., "User Authorization System and Methods," Office Action mailed May 31, 2011, for U.S. Appl. No. 12/269,673, 17 pages.

Ruppert et al., "User Authorization System and Methods," Amendment filed Aug. 5, 2011, for U.S. Appl. No. 12/269,673, 15 pages.

Ruppert et al., "User Authorization System and Methods," Office Action mailed Jan. 5, 2012, for U.S. Appl. No. 12/269,673, 18 pages.

Ruppert et al., "User Authorization System and Methods," Amendment filed Mar. 5, 2012, for U.S. Appl. No. 12/269,673, 16 pages.

Ruppert et al., "User Authorization System and Methods," Notice of Allowance mailed Mar. 27, 2012, for U.S. Appl. No. 12/269,673, 8 pages.

\* cited by examiner

SYSTEM AND METHOD FOR AUTOMATED CUSTOMER ACCOUNT CREATION AND MANAGEMENT

BACKGROUND

Technical Field

The present disclosure pertains to a system and method for capturing and updating customer information in order to establish and maintain customer accounts.

Description of the Related Art

Servicing a small number of consumers in low-volume high-margin markets allows—and in many cases requires—a business to provide customers with personal attention to ensure continued customer satisfaction and development. In contrast, the mass market environment generally operates on a high-volume, low-margin model where large numbers of people enter the premises, such as malls, airports, sports arenas, theaters, casinos, and other similar venues, and personal customer contact is, at best, remote and removed.

The modern approach in a customer-centric business utilizes the customer relationship management model in which a comprehensive profile of consumer needs, expectations, and behaviors is used to establish positive customer relationships. Retention of customers relies on accurate customer data, which is used to analyze behavior and design marketing strategies that will sustain and maximize customer loyalty.

This process begins with the collection of data and information from which a 360-degree view of the customer is developed. Because consumer loyalty is dependent on understanding past behavior as well as current needs and wants, designing a program that rewards loyalty must not only take into account this information but also adapt the administration of the loyalty program to changing trends in business technology.

In the casino environment, cashless gaming is a developing trend. One implementation involves the use of patron account cards (commonly referred to as player loyalty or club cards) that are designed to accept and disperse credit for play, to accept and carry data regarding game play by the player, and to enable download of this information to single or multiple sites for management of player accounts and analysis of patron behavior. Bonuses and promotional activities can be included as a package with the patron account card to further encourage and reward loyalty. Thus, a patron account card contains a range of personal data, including debit and credit data, game play data, as well as personal identification information. While these patron account cards are not required, they do enhance the player's experience and help develop customer loyalty in the form of return visits to the issuer of the patron account card.

Various methods have been proposed for allocating loyalty reward points in the casino industry. For example, U.S. Patent Publication No. 2006/0217185, describes a method and system for allocating loyalty reward points to gaming players using gaming tables in which radio frequency identification circuits embedded in the chips track the betting and play characteristics of the players. A loyalty card associated with the chips is used to store information about chip use, which is later read when the loyalty card is swiped through a reader.

Hence, in the cashless gaming system, the use of electronically-readable loyalty cards, club cards, patron account cards, and the like is important to success of the system. Notably, cashless transactions are being adopted throughout commerce, and the key to consumer acceptance is the convenience of electronic data capture, both in hardwired and Wi-Fi modalities, such as found in banks, stores, entertainment centers, and service industries. While it is desirable to encourage and facilitate the use of patron account cards in casinos, there are several drawbacks to current patron account card distribution schemes.

Typically, a player must follow signs pointing to a "player's club" or a player must ask a casino employee where to apply for a patron account or player club card. Once the player is provided with an application, they must fill out the application to include their name, date of birth, mailing address, and other personal data, including submission of an approved identification form. A casino employee will enter the information into the casino's computer system and issue a card to the patron at that time. If a player loses their patron account card or forgets to bring it, they will have to repeat the process to obtain a duplicate account card. Redemption of bonus points requires a similar process in which the patron must show their patron account to a casino employee. Because each casino issues their own player account cards, players must go through this process at each casino they visit.

Thus, in order to issue a patron account card, the issuer must create a unique account, one that in most cases is linked to the identity of the patron. This in turn requires a patron to provide personal information, generally to another person. The card issuer must hire and train administrative staff, and it means the patron must defer playing and/or purchasing in order to spend time to meet with the staff, sometimes waiting in long lines to do so. Security concerns are another issue, i.e., protecting current customer accounts from unauthorized use. Customer reluctance to divulge personal information and the reluctance of businesses to utilize and maintain sufficient staff are obstacles to be addressed and overcome.

BRIEF SUMMARY

The present disclosure is directed to a system and method for creating and updating a patron account and for the issuance of a patron account card to the patron that overcomes the foregoing difficulties.

Ideally, a kiosk is used, or an existing kiosk is adapted to utilize the system in which an approved form of identification, such as a driver's license bar code or magnetic strip, is read and the data captured therefrom for use by the computer system to identify the driver's license holder and create a new patron account or update an existing patron account.

In accordance with one embodiment of the present disclosure a computer-implemented method of creating and managing patron accounts using electronic data capture and generating a patron account card at an automated kiosk is provided. The method includes electronically obtaining personal patron identification information from a patron identification source; determining from the personal patron information if a patron account exists in the computer system and determining if the patron identification source is expired; and if the patron identification source is expired, updating the patron account if it exists, and if the patron identification source is not expired, updating the patron account if it exists with the captured personal patron information, or if no patron account exists, creating a temporary patron account and providing a temporary patron account card.

In accordance with another aspect of the foregoing embodiment, electronically obtaining personal patron identification information includes using at least one from among a magnetic card reader, a machine-readable symbol reader, a fingerprint sensor, a retina scanner, a photo imaging device, a radio frequency data exchange device, and a driver's license scanner. Ideally, the method includes providing notification when the patron identification source has been determined to be expired. Notification can be provided to at least one of the patron and a manager of patron accounts at the patron account card issuer.

In accordance with another aspect of the foregoing embodiment, an existing patron account is inactivated when the patron identification source is determined to be expired.

In accordance with another aspect of the foregoing embodiment, the system is adapted to monitor patron activity via patron use of the patron account card, whether it be a temporary or permanent patron card. Ideally, a permanent patron account and account card are created along with a personal identification number to the patron upon creation of the permanent patron account using the computer-implemented system. In this process, data is transferred from the temporary patron account card to the patron permanent account, which could, but not necessarily, require the use of a patron personal identification number.

In accordance with another aspect of the foregoing embodiment, bonuses are provided to a patron based on monitored patron activity via the patron account card. The bonus can include one from among compensation points, coupons, discounts, entry into a drawing or game of chance, credit to a patron account, and other similar rewards.

In accordance with another embodiment of the present disclosure, a computer-implemented system for automated patron account creation and management using electronic data capture of patron identification information taken from a patron identification source is provided. The system includes an electronic data capture system configured to electronically obtain personal patron identification information from at least one patron identification source; a computer system coupled to the electronic data capture system and configured to receive the patron identification information from the electronic data capture system, the computer system configured to determine from the personal patron information if a patron account exists in the computer system and determining if the patron identification source is expired; and if the patron identification source is expired, updating the patron account if the patron account exists, and if the patron account does not exist, not setting up a temporary patron account; and if the patron identification source is not expired, updating the patron account if it exists with the personal patron information or, if no patron account exists, creating a temporary patron account; and a device for creating a temporary patron account card and optionally delivering the patron account card to the patron.

In accordance with another aspect of the foregoing embodiment, the electronic data capture system includes at least one from among a magnetic card reader, a machine-readable symbol reader, a fingerprint sensor, a retina scanner, a photo imaging device, a radio frequency data exchange device, and a driver license scanner.

In accordance with another aspect of the foregoing embodiment, the system includes a machine for use by the patron. The machine is adapted to provide services or goods or both to the patron. In one embodiment, the machine can be a slot machine. The machine is coupled to the computer system and configured to be activated and deactivated by the computer system in response to receipt and processing of the patron identification information.

In accordance with another aspect of the foregoing embodiment, the system is adapted to monitor machine use by the patron and store data of machine use in at least one of the patron account and the temporary patron account card. Ideally, the computer system is adapted to download data regarding patron use of the machine from the temporary patron account card and to utilize the data in creating and managing a permanent patron account.

Thus, in accordance with another aspect of the foregoing embodiment, the system is adapted to create a permanent patron account and to provide a patron personal identification number to the patron.

In accordance with another embodiment of the present disclosure, a method of creating a temporary casino patron account and utilizing the temporary casino patron account is provided, the method including reading patron identification information from a patron identification source at an electronic data capture device located at the gaming machine; comparing the personal patron identification information against a patron account database and determining from the comparison if the personal patron identification information matches an existing patron account in the database; creating a temporary patron account if the personal patron identification information does not match an existing patron account in the patron account database; and monitoring game play data generated by the patron using the temporary patron account.

In accordance with another aspect of the foregoing embodiment, the method includes creating a permanent patron account for the patron and transferring game play data from the temporary account into the permanent patron account.

In accordance with another aspect of the foregoing embodiment, the method includes bonusing data based upon the game play data.

In accordance with another aspect of the foregoing embodiment, the method includes providing a player account card to the patron if the comparison of the personal patron identification information matches a patron account in the patron account database.

In accordance with another aspect of the foregoing embodiment, the method includes receiving a personal identification number from the patron and comparing the personal identification number with information associated with the patron account for verification; and providing access to the patron to additional casino services when the personal identification number provided by the patron matches the personal identification number associated with the patron's account in the patron account database.

As will be readily appreciated from the foregoing, the present disclosure provides a means whereby a new or existing operation enables creation of a player account card for tracking a patron's play within the gaming and nongaming areas without delay. With this, a player could insert or swipe any identification bearing a magnetic stripe to create an account or search for an account if that instrument is set up as other identification on a player record. This permits any unregistered or registered patron (without a player card) to come to a slot machine, for example, and insert any identification (e.g., driver's license, passport, national identification card, credit card, debit card, etc.) in his possession. The system determines if this is a unique identification and then creates a temporary or permanent patron account or updates an existing account with play. Bonusing can start accruing from the time the identification card is inserted and a name associated to the patron. At a later time, a patron can go to a club desk to update the patron account that was automatically created or have a permanent patron account assigned the game bonus from the temporary account card using the patron's identification used for the newly create account. This removes barriers to entry for a patron to create a temporary account and provides an opportunity to capture other information about a patron for marketing needs. The method and system automates what was and has always been done manually or without the need to create temporary-type cards that later provide another update function during a normally busy time for staff.

In addition, the use of a stand-alone kiosk enables the kiosk manager or owner to give users different offers at the time of registration, such as free cash back, points to use at casino venues, random chance sweepstakes, and other similar rewards. Thus, this provides an opportunity to help encourage patrons to register and avoid long lines at a club desk.

The teachings of the present disclosure can be added to any existing kiosk or machine, such as a slot machine. The slot machine will now accept a patron's account card, driver's license, credit card, or other form of identification that will capture personal data for comparison with information stored on an account. The kiosk would also have the ability to take a picture, scan an identification for storage and presentation in the system when identification is required, as well as capture a fingerprint or make a retinal scan for other forms of future identification of a patron.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

In the drawings, identical reference numbers identify similar elements or acts. The size and relative positions of elements in the drawings are not necessarily drawn to scale. For example, the shapes of various elements are not drawn to scale, and some of these elements are arbitrarily enlarged and positioned to improve drawing legibility. Further, the particular shapes and the elements as drawn are not intended to convey any information regarding the actual shape of the particular elements and have been solely selected for their ease and recognition in the drawings.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with kiosks, scanners, cameras, imagers, optics, computers, computer networks, data structures, databases, and networks such as the Internet, have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
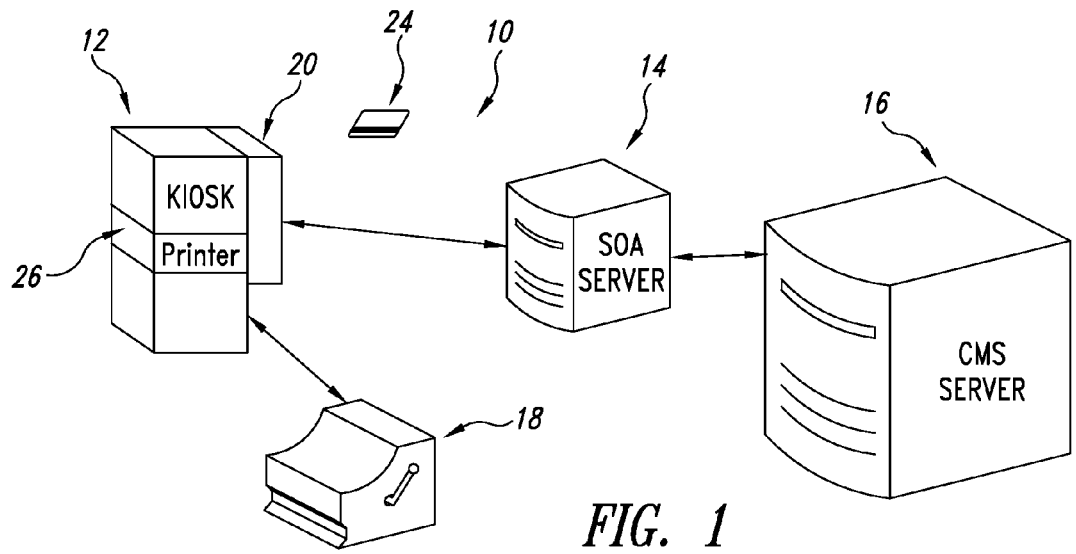
FIG. 1 is a schematic of a system formed in accordance with the present disclosure.

Referring initially to FIG. 1, shown therein is a general schematic of an overview of a system 10 formed in accordance with the present disclosure to include a kiosk 12, a Service Oriented Architecture (SOA) server 14 coupled to the kiosk 12 for two-way communication, and a Casino Management System (CMS) server 16 coupled for two-way communication to the SOA server 14. In another embodiment, a machine, such as a slot machine 18, is coupled to the kiosk 12 for two-way communication. While this particular embodiment of the present disclosure will be described with respect to casinos, it is to be understood that the embodiments described herein can be adapted for use in other venues and applications.

Associated with the kiosk 12 is a data capture device 20 that is configured to use electronic data capture of patron identification information taken from a patron identification source 22, such as a driver's license having a machine-readable symbol (e.g., a bar code symbol), a magnetic stripe, or a radio frequency identification (RFID) transponder. In one embodiment of patron identification used in the creation of a player's card, the identification 24 is a driver's license with a bar code or a magnetic stripe that encodes or provides access to name, address, date of birth, driver's license number, state and country of issuance, and expiration information to the system 10. It is to be understood that other forms of approved identification could be used to capture this information, among these are passports and national identifications.

In another embodiment, the data capture device 20 is configured to scan in a photographic identification, to take a photograph of the patron, and/or to capture a fingerprint or retinal scan. All of these forms of identification are then converted into digital format for processing by the SOA server 14 and ultimately the CMS server 16.

Other forms of identification that can be scanned in and used in the system 10 include military identification, foreign entry visa, credit cards that may have biometrics or a picture of the holder, residency ("green") cards, as well as other forms of identification identified as acceptable by the manager of the system 10, which in this case would be a casino operator.

All data stored in the servers 14 and 16 would be encrypted for security purposes. Existing accounts will be used to identify the owner of an identification when it is properly read by the data capture device 20 or when identification is based on biometric data, and the like.

A printer 26 is associated with the kiosk 12 and configured to print out a temporary player account card for the patron once the identification has been verified and either linked with an existing patron account or a temporary patron account has been created.

Verification of the information can include a determination of whether the form of identification has expired. In one embodiment, the system is configured to provide notification to one of at least the patron or the manager of the system, and if the patron has an account, the account is updated to show the expiration of the identification. If no account exists, the process does not create an account or issue a temporary patron account card. The system can be configured to prompt the patron for another form of identification, at which point the process begins again.

A machine, such as the slot machine 18, is coupled to the kiosk 12 for bidirectional communication. Alternatively, the data capture device 20 can be coupled directly to the slot machine 18, which in turn would be coupled directly to the SOA server 14, eliminating the need for a kiosk. The printer 26 could also be associated with the slot machine 18 for printing of a patron account card. In this configuration, a patron can, for example, swipe an approved form of identification directly at the slot machine 18, which is activated once the identification is accepted and a corresponding account has been identified or created through the SOA server 14 or the CMS server 16 or both.

With this, a patron could use any identification media to create an account or search for an account if that identification media is set up as other identification on the patron's account record.

Figure 2:
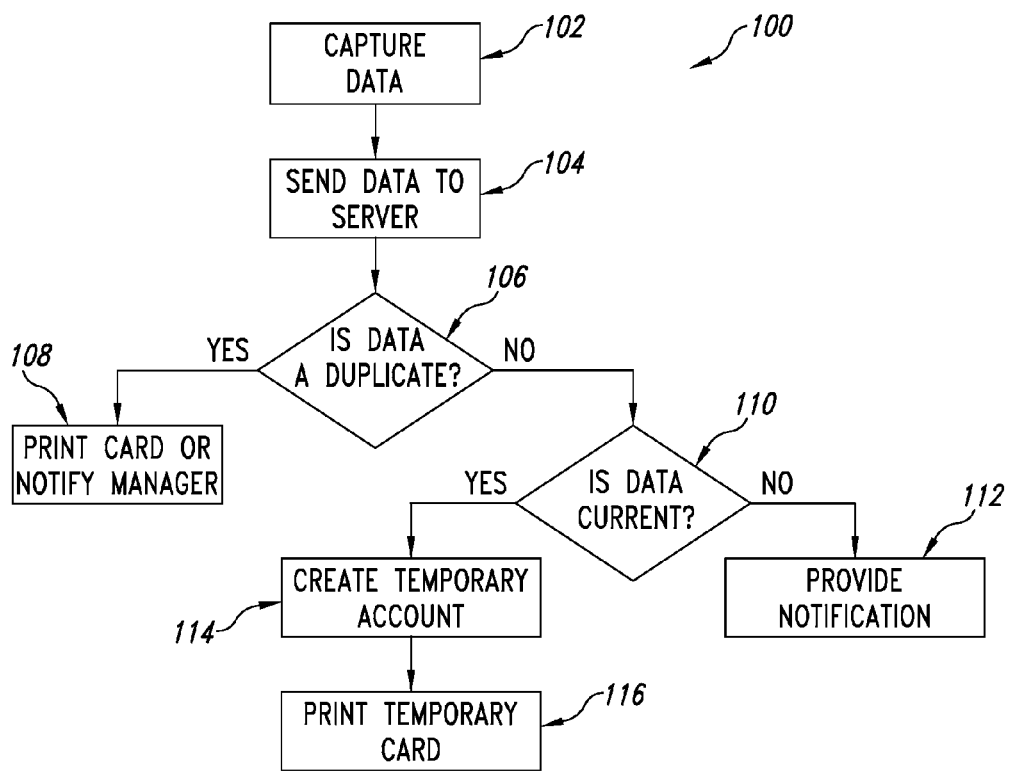
FIG. 2 is a flowchart illustrating one method in accordance with the present disclosure.

Referring next to FIG. 2, shown therein is a generalized flowchart for a computer-implemented method 100 of creating and managing patron accounts using electronic data capture and generating a patron account card. As described above, the method can be implemented using a stand-alone kiosk 12 or at a machine, such as a slot machine 18 using an integral or separately attached electronic data capture device 20 with optional printer 26. As shown in FIG. 2, personal patron identification information is electronically captured from a patron identification source, such as the forms of identification described above. This can include swiping or magnetic reading of a magnetic stripe or a magnetic code, optically reading a machine-readable symbol and/or interrogating an RFID transponder from a driver's license or identification card provided to a nondriver, a passport, international identification, national ID, military ID, foreign entry visa, credit cards, debit cards, licensed permanent resident's ("green") card, or other ID used as a primary identification by the manager of the system, such as a casino operator.

The means of electronic data capture can also include taking a photograph, scanning in a picture ID, retinal scan, fingerprint, or a communication with a radio frequency data exchange device. Thus, data capture can be done using a magnetic card reader, a machine-readable symbol reader, fingerprint sensor, retina scanner, photo imaging device, RFID exchange device, and a driver's license scanner.

Once the data is captured at 102, it is then sent to the SOA server 14 and shared with the CMS server 16 as shown at 104. All data captured at 102 is encrypted in at least one of the servers 14, 16.

At 106, the system searches its memory or database to determine if the patron's identification is already in the system and if the captured data is merely a duplicate. For example, if a patron provided an existing patron or player account card, the system would recognize this as an existing account and commence tracking the patron's play. If the system is used to activate a machine 18, the machine would then be activated.

If the read identification is not from an existing patron or player account card, the system would print a temporary patron account card, thus allowing the patron to immediately begin play without having to delay play while obtaining a temporary patron account card from the manager of the system.

If a patron account is determined to exist based upon the captured data, the system will use the captured data to update the patron's account. If a patron's account card has been read, the play and bonus information from that patron account card is used to update the patron's account. For example, if the patron had visited another property owned by the manager of the system and obtained bonus points and the like, which would be stored on the patron's account card, the system captures this information and updates the patron's account at this property. This assumes that the system is not integrated into all of the properties, in which case the information would be shared among the properties and not necessarily needed from the existing patron's account card.

In an alternative embodiment, if the data is determined to be a duplicate, the system will verify if the current identification information provided by the patron is valid and not expired, such as a driver's license. If the information is determined to be out of date, the system may notify a manager or security personnel. Alternatively, the system could also notify at least the patron, and it could also ask for an alternative form of identification, thus allowing the patron to immediately begin play without intervention by the manager of the system.

If the comparison of the captured data determines it is not a duplicate, the system then verifies if the captured data is current and valid. For example, if a driver's license is read, the system will verify that the driver's license is current. If the patron identification source is not current, such as expired, the system can be configured to provide notice to at least one of the patron and the system manager. In addition, the system can be configured to request an alternative form of identification without providing notice to the manager of the system, giving the patron an opportunity to continue attempting to obtain a temporary patron account card.

Thus, at 110, if the data is determined to be current, then the system will create a temporary account for the patron as shown at 114 and provide the patron with a temporary patron account card, shown at 116.

The system can be further configured to enable the patron to obtain a permanent patron account card and establish a permanent account using the temporary patron account card. Game play data would be transferred from the temporary account into the permanent account and a personal identification number created by the patron by having the patron visit the manager of the system or a manager's representative and supply the necessary identification for receiving a personal identification number (PIN). With a PIN, the patron would then have access to other services and offers provided by the manager of the system or vendors who work in cooperation with the manager of the system. For example, a kiosk would have a display screen coupled to at least one of the SOA server 14 and CMS server 16 to show offers available once an account is created or verified to be in existence for the patron. This provides the ability to the manager of the system to capture new marketing data for future offers and provide the new patron with a bonus or coupon that could be used in any of the facilities of the system manager, such as restaurants, or to provide entry into sweepstakes for future or current visits and other promotional offerings. The PIN would also allow the patron to obtain a replacement patron account card if it is lost or left at home by the reading of data from a properly readable identification and finding a match for the patron's account in the system. Thus, the PIN provides an additional layer of security while encouraging patrons to create permanent accounts.

Business rules for accepting identification, such as that taken from credit cards, would be jurisdiction dependent. For example, not all locations would determine if a driver's license has expired. Other locations may require the caption of biometric data, such as fingerprints, retina scan, or a photographic image of the patron.

When applied specifically at a casino, a method of creating a casino patron account at a kiosk is provided in the present disclosure. The method may include reading driver's license data at a kiosk license reader, comparing the data against a casino patron account database and determining from the comparison if a patron account with matching data exists. If an account does not exist, a unique patron account, such as a temporary account, may be created and the captured driver's license data assigned to that casino patron account. A temporary patron account card or a permanent patron account card as determined by the rules of the location, may then be issued to the patron at the kiosk through the printer 26. If a temporary patron account is created, game play would be monitored for the temporary patron using the temporary patron account card and the temporary patron account. The patron would be allowed to create a permanent patron account, at which time game play and bonus data would be transferred from the temporary account into the permanent account. The temporary patron account card could be converted to a permanent patron account card, or a new permanent patron account card issued.

If the patron desires to have a personal identification number, the location rules could require the patron to visit with the manager of the system and supply additional personal identification for verification prior to receiving a new PIN number or a replacement PIN number.

As will be readily appreciated from the foregoing, the method and system described above will enable automatic creation of patron accounts and providing patron account cards to patrons, which will assist in the most critical of marketing functions, i.e., identifying customers, tracking customer behavior, and providing services to customers that will enhance customer loyalty. The system can also provide a visual display at the kiosk to show a patron where and how to use the patron account card and where they need to go to provide identification for a personal identification number when it is more convenient for the patron to do so.

As will be readily appreciated, the foregoing system and method provide a function to get patrons out of lines and on the business floor in a fashion that provides better service to patrons while enabling the business to track consumer behavior. Instead of manually capturing data at a mall or other site, marketing staff at the location can introduce prospective patrons to the kiosk self-serve process that will then generate their patron account card and create an account for them to play, thus providing an opportunity to capture other information about a client for marketing needs. The kiosk can give the patron different offers at the time of registration, such as free cash back at the machine, points to use at casino venues, random chance sweepstakes, etc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments. It is to be understood that this application can be added to any existing kiosk or machine to accept the different forms of identification, properly capture the data, and compare the data to the existing database, as well as provide a temporary or permanent card.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method of creating and managing multiple patron accounts using electronic data capture and generating patron cards at an automated kiosk, the method comprising:

responsive to an external identification source being located within a capture range of at least one personal identification information capture device, electronically capturing, by the at least one personal identification information capture device, personal patron identification information of a patron from the external identification source, the external identification source comprising at least one from among a driver's license, passport, military ID, foreign entry visa, credit card, debit card, green card, photograph ID;

responsive to electronic capture of the personal identification information from the external identification source, transmitting, by the at least one personal identification information capture device, the electronically captured personal identification information to at least one service oriented architecture server or casino management system server;

responsive to receipt of the electronically captured personal identification information, automatically determining, by the at least one service oriented architecture server or casino management system server and based on at least one portion of the electronically captured personal identification information, whether the patron has an existing patron account at one or more properties associated with the at least one service oriented architecture server or casino management system server;

responsive to receipt of the electronically captured personal identification information, automatically determining, by the at least one service oriented architecture server or casino management system server, whether the external identification source is expired;

responsive to determining that the patron has the existing patron account at the one or more properties associated with the at least one service oriented architecture server or casino management system server and that the external identification source is expired, updating, by the at least one service oriented architecture server or casino management system server, the existing patron account to indicate that the external identification source is expired;

responsive to determining that the patron has the existing patron account at the one or more properties associated with the at least one service oriented architecture server or casino management system server and that the external identification source is not expired, updating, by the at least one service oriented architecture server or casino management system server, the existing patron account with the electronically captured personal patron identification information;

responsive to determining that the patron has no existing patron account at the one or more properties associated with the at least one service oriented architecture server or casino management system server and that the external identification source is not expired, creating, by the at least one service oriented architecture server or casino management system server, a temporary patron account at the one or more properties associated with the at least one service oriented architecture server or casino management system server;

responsive to updating the existing patron account or creating the temporary patron account at the one or more properties associated with the at least one service oriented architecture server or casino management system server, transmitting, by the at least one service oriented architecture server or casino management system server, a validation signal to a patron account card printer; and responsive to receipt of the validation signal, printing, by the patron account card printer, a temporary patron account card, the temporary patron account card including at least one machine readable symbol or nontransitory computer-readable medium, the at least one machine readable symbol or nontransitory computer-readable medium being indicative of or storing thereon one or more of debit data that permits the patron to debit the temporary patron account via the temporary patron account card, credit data that permits the patron to credit the temporary patron account via the temporary patron account card, game play data that indicates game play of the patron, and personal identification information that identifies the patron.

2. The method of claim 1, wherein electronically capturing personal patron identification information, by the personal identification information capture device, comprises reading the external identification information with at least one from among a magnetic card reader, a machine-readable symbol reader, a fingerprint sensor, a retina scanner, a photo imaging device, a radio frequency data exchange device, and a driver license scanner.

3. The method of claim 1, further comprising:
inactivating an existing patron account when the external identification source is expired.

4. The method of claim 1, further comprising monitoring patron activity via patron use of the temporary patron account card.

5. The method of claim 1, further comprising creating a permanent patron account and printing a patron account card and providing a personal identification number to the patron upon creation of the permanent patron account when the existing patron account is updated.

6. The method of claim 5, further comprising transferring data from the temporary patron account card to the permanent patron account using the personal identification number.

7. The method of claim 4, further comprising providing a bonus to the patron based on monitored patron activity.

8. The method of claim 7, wherein providing a bonus includes providing at least one from among compensation points, coupons, discounts, entry into a drawing or game of chance, and credit to the patron account.

9. A computer-implemented system for automated patron account creation and management of multiple patron accounts using electronic data capture of patron identification information taken from a patron identification source, the system comprising:

a personal identification information capture device that electronically captures personal patron identification information from at least one external identification source, the external identification source comprising at least one from among a driver's license, passport, military ID, foreign entry visa, credit card, debit card, green card, photograph ID, retinal scan, and fingerprint;

a patron account card printer that physically prints a temporary patron account card and physically delivers the patron account card to the patron; and at least one service oriented architecture server or casino management system server communicatively coupled to the personal identification information capture device and the patron account card printer, the at least one service oriented architecture server or casino management system server having at least one non-transitory medium having at least one patron account database and computer-readable instructions stored therein, the computer-readable instructions, when executed by the at least one service oriented architecture server or casino management system server, cause the at least one service oriented architecture server or casino management system server to:

receive the personal patron identification information from the personal identification information capture device;

automatically compare the personal patron identification information against the patron account database stored in the at least one non-transitory medium of the at least one service oriented architecture server or casino management system server;

determine from the comparison that the personal patron identification information does not match an existing patron account in the database;

responsive to determining that no existing patron account match exists, automatically create a temporary patron account for the patron that includes at least one portion of the received personal patron identification information; and responsive to creating the temporary patron account, automatically print via the patron account card printer a physical temporary patron card associated with the temporary patron account, the temporary patron account card including at least one machine readable symbol or nontransitory computer-readable medium, the at least one machine readable symbol or nontransitory computer-readable medium being indicative of or storing thereon one or more of debit data that permits the patron to debit the temporary patron account via the temporary patron account card, credit data that permits the patron to credit the temporary patron account via the temporary patron account card, game play data that indicates game play of the patron, and personal identification information that identifies the patron.

10. The system of claim 9, wherein the personal identification information capture device comprises at least one from among a magnetic card reader, a machine-readable symbol reader, a fingerprint sensor, a retina scanner, a photo imaging device, a radio frequency data exchange device, and a driver license scanner.

11. The system of claim 9, wherein the at least one service oriented architecture server or casino management system server communicatively couples to at least one machine for use by patrons to obtain services or goods or both, and wherein the instructions further cause, when executed by the at least one service oriented architecture server or casino management system server, at least one service oriented architecture server or casino management system server to activate or deactivate the machine in response to receipt and processing of the personal patron identification information.

12. The system of claim 11, wherein the instructions further cause, when executed by the at least one service oriented architecture server or casino management system server, the at least one service oriented architecture server or casino management system server to monitor machine use by the patron that uses the temporary patron card and store data indicative of the machine use in at least one of the temporary patron account and the temporary patron account card.

13. The system of claim 12, wherein the instructions further cause, when executed by the at least one service oriented architecture server or casino management system server, the at least one service oriented architecture server or casino management system server to download data regarding the machine use from the temporary patron account card and to utilize the data in creating and managing a permanent patron account.

14. The system of claim 11, wherein the instructions further cause, when executed by the at least one service oriented architecture server or casino management system server, the at least one service oriented architecture server or casino management system server to create a permanent patron account and a patron personal identification number and to provide the patron personal identification number to the patron upon creation of the permanent patron account.

15. The system of claim 11, wherein the machine comprises a slot machine.

16. A method of creating and using a temporary casino patron account at a kiosk or gaming machine implemented in instructions further cause, when executed by the at least one service oriented architecture server or casino management system server, the at least one service oriented architecture server or casino management system server having a processor and a non-transitory computer-readable medium communicatively coupled to the processor, the method comprising:

reading, via a personal identification information capture device located at the kiosk or gaming machine and communicatively coupled to the at least one service oriented architecture server or casino management system server, personal patron identification information from an external identification source the external identification source comprising at least one from among a driver's license, passport, military ID, foreign entry visa, credit card, debit card, green card, and photograph ID;

automatically comparing, by the at least one service oriented architecture server or casino management system server, the personal patron identification information against a patron account database stored in the non-transitory computer-readable medium of the at least one service oriented architecture server or casino management system server;

determining, by the at least one service oriented architecture server or casino management system server and from the comparison, that the personal patron identification information does not match information associated with an existing patron account in the patron account database;

responsive to determining that the personal patron identification information does not match information associated with an existing patron account in the patron account database, creating, by the at least one service oriented architecture server or casino management system server, the temporary patron account for the patron, the temporary patron account including at least one portion of the read personal patron identification information;

responsive to creating the temporary patron account, automatically printing, via a patron account card printer at the kiosk or gaming machine, a physical temporary patron card, the temporary patron account card including at least one machine readable symbol or nontransitory computer-readable medium, the at least one machine readable symbol or nontransitory computer-readable medium being indicative of or storing thereon one or more of debit data that permits the patron to debit the temporary patron account via the temporary patron account card, credit data that permits the patron to credit the temporary patron account via the temporary patron account card, game play data that indicates game play of the patron, and personal identification information that identifies the patron;

automatically delivering, via the patron account card printer at the kiosk or gaming machine, the physical temporary patron card to the patron; and monitoring, by the at least one service oriented architecture server or casino management system server, game play data generated responsive to the patron using the temporary patron account.

17. The method of claim 16, further comprising:
responsive to receiving a permanent patron account request from the patron, creating, by the at least one service oriented architecture server or casino management system server, a permanent patron account for the patron; and
responsive to creating the permanent patron account, transferring, by the at least one service oriented architecture server or casino management system server, game play data from the temporary account into the permanent patron account.

18. The method of claim 17, wherein the game play data comprises bonusing data.

19. The method of claim 16, further comprising:
receiving, by the at least one service oriented architecture server or casino management system server, a personal identification number that the patron input via the kiosk or gaming machine;
comparing, by the at least one service oriented architecture server or casino management system server, the personal identification number with information associated with the existing patron account for verification; and
responsive to determining that the personal identification number provided by the patron matches the information associated with the existing patron account in the patron account database, providing, by the at least one service oriented architecture server or casino management system server, the patron access to additional casino services.

20. The method of claim 16, further comprising, responsive to creating the temporary patron account and delivering the temporary patron account card to the patron, providing, via the patron account card printer at the kiosk or gaming machine, printed coupons to the patron.

* * * * *